United States Patent [19]
Wightman et al.

[11] 3,712,632
[45] Jan. 23, 1973

[54] DRILL CHUCK WITH CEMENTED ALIGNING BUSHING

[75] Inventors: Lawrence W. Wightman; Thomas J. Long, both of St. Louis, Mo.

[73] Assignee: Emerson Electric Co., St. Louis, Mo.

[22] Filed: Dec. 18, 1970

[21] Appl. No.: 99,546

[52] U.S. Cl. ................................. 279/1 L, 279/62
[51] Int. Cl. .................................... B23b 31/04
[58] Field of Search ....... 279/1 A, 1 L, 1 ME, 1 R, 62

[56] References Cited

UNITED STATES PATENTS 2,258,377  10/1941  Collins............................279/1 ME
3,463,048  8/1969  Owsen ............................279/1 R X Primary Examiner—Andrew R. Juhasz
Assistant Examiner—Z. R. Bilinsky
Attorney—Charles E. Markham

[57] ABSTRACT

A key-operated universal drill chuck in which a tapered bushing adapted to receive a tapered driving shaft is entered into an axial bore in the chuck body in loose fitting relationship and cemented therein precisely coaxial with a cylinder held in the chuck jaws.

5 Claims, 6 Drawing Figures

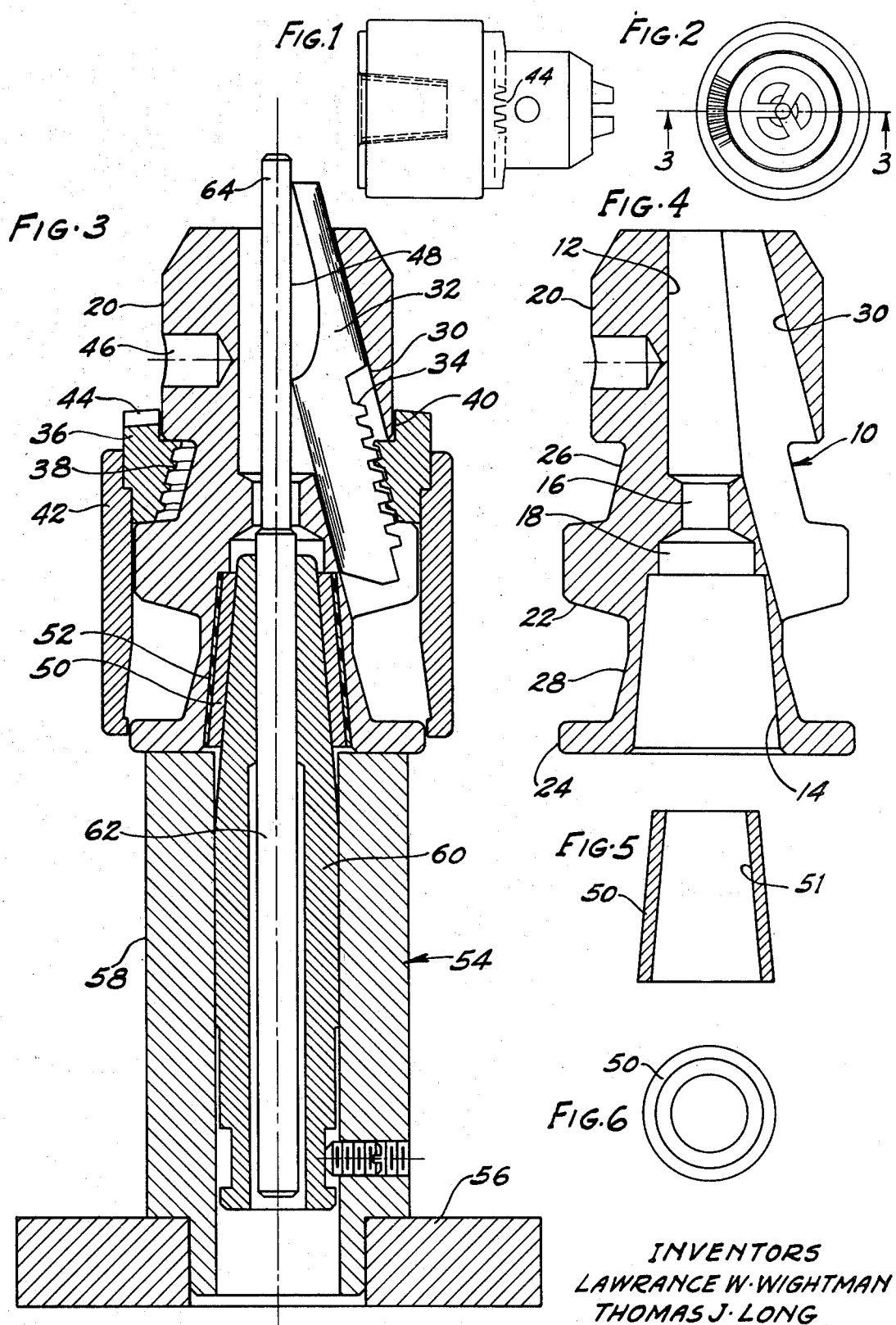

DRILL CHUCK WITH CEMENTED ALIGNING BUSHING

This invention relates to universal drill chucks in which elongated jaws slidably guided in forwardly converging passages in the chuck body are moved between open and closed positions by rotation of a nut engaging sectional screw threads formed on the jaws, and in which an axial tapered bore is formed in the chuck body for receiving the tapered end of a driving shaft.

In the construction of chucks of this type, the manufacturing tolerances required to retain costs within reasonable limits frequently result in objectionable eccentricity and misalignment of the driving shaft, or spindle, and a drill or other tool held in the chuck jaws.

An object of the present invention is to provide a generally new and improved universal drill chuck in which an alignment member comprising a bushing having a tapered bore adapted to receive a driving shaft is cemented to the chuck body precisely coaxial with a cylinder held in the chuck jaws after the chuck is otherwise completely assembled.

A preferred embodiment of the invention is shown in the accompanying drawings, in which:

FIG. 1 is a side elevational view of a universal drill chuck constructed in accordance with the present invention;

FIG. 2 is a front elevational view of the chuck shown in FIG. 1;

FIG. 3 is an enlarged, longitudinal, cross-sectional view of the assembled chuck taken along line 3—3 of FIG. 2, shown in association with an assembly fixture employed in positioning the aligning bushing in the chuck body;

FIG. 4 is an enlarged, longitudinal, cross-sectional view of the chuck body; and FIGS. 5 and 6 are, respectively, a longitudinal cross-sectional view and an end elevational view of the tapered aligning bushing.

Referring to the drawing in more detail, the chuck comprises a round elongated body member 10 having an axial cylindrical bore 12 entering from its front end, an axial tapered bore 14 entering from its rear end, and smaller diameter bores 16 and 18 aligned with and connecting bores 12 and 14. The body 10 is further characterized by a forward cylindrical portion 20, a forward cylindrical flange portion 22, a rear cylindrical flange portion 24, a forward annular recess between the forward cylindrical portion 20 and flange portion 22, and a rear annular recess 28 between the forward and rear flange portions 22 and 24.

Three longitudinal, forwardly converging bores 30 of equal angular spacing about the body axis extend through the forward cylindrical body portion 20, the forward recessed portion 26, and the forward flange portion 22. The bores 30 each slidably receive a round elongated jaw member 32, each of which jaw members have sectional screw threads 34 extending across one side of the rear portions thereof. A round, split nut 36 entered into the body recess 26 is provided with screw threads 38 which engage the sectional threads 34 on the jaws 32 so that, as the nut 36 is rotated, the jaws 32 are caused to move longitudinally in the forward converging body bores 30.

The split nut 36 is provided with a counterbore 40 at the forward end thereof which receives a rear end portion of the forward cylindrical body portion 20, and the exterior surface of the nut is press fitted upon assembly into a skirt member 42. The two half-circle sections of the split nut are thereby retained in position to complete a circular nut which is retained against axial movement in the recess 26. The forward end of split nut 36 is provided with bevelled gear teeth 44, and a conventional key (not shown) having matching bevelled gear teeth and a pilot pin adapted to be inserted in a hole 46 in the chuck body is employed to rotate nut 36.

The fore end portions of the round elongated jaws 32 are each formed with an elongated flat surface 48 on the side thereof opposite the sectional screw threads 34. These flat surfaces 48 are inclined to the axis of the jaws and parallel to the axis of the chuck body. As the jaws 32 are moved slidably in the converging body bores 30, the flat surfaces 48 move radially and remain parallel to the axis of the chuck body.

Loosely fitted and cemented in the rear tapered body bore 14 by a cementing material 52 is a tapered alignment bushing 50 having an internally tapered surface 51 adapted to receive the similarly tapered end portion of a spindle or drive shaft. The relationship of the external dimension of the bushing 50 to that of the tapered body bore 14 is such as to provide sufficient annular space to permit appreciable lateral as well as tilting movement of the bushing 50 in the bore 14. The cementing material 52 is preferably an epoxy resin having a paste form in which it is applied to fill the annular space between the bushing 50 and body 14 while permitting lateral and tilting movement of bushing 50. The cement is also heat hardenable with negligible shrinkage and when hardened forms a rigid structural joint rigidly connecting the bushing and chuck body.

To facilitate the cementing of the tapered bushing 50 in the body 10 precisely concentric and in alignment with the cylindrical shank of a drill, or other tool, engaged in the chuck jaws, an assembly fixture generally indicated at 54 is provided. The fixture 54 comprises a flat base portion 56, a vertical hollow cylindrical portion 58, a cylindrical sleeve member 60 having a close slidable fit in the hollow cylindrical portion 58, and an aligning rod 62 having a close slidable fit in the sleeve member 60. The aligning rod 62 has an upwardly extending cylindrical portion 64 adapted to extend upward through the chuck body and to be engaged by the flat surfaces 48 of the chuck jaws. The upper end portion of cylindrical sleeve member 60 is tapered at the same angle as that of the interior of bushing 50, and this portion of the sleeve extends upwardly beyond the vertical, hollow, cylindrical portion 58.

In assembling and cementing the alignment bushing 50 in the chuck body, the bushing 50 is placed on the upper tapered end of fixture member 60, and the cement, in paste form, is applied to the exterior surface thereof. The fixture aligning rod 62 is then slidably moved upward, and the chuck body, with jaws 34, nut 36, and skirt 42 assembled thereto, is then slipped on the aligning rod 62 and the chuck jaws tightened on the upper end portion of the aligning rod. The chuck and aligning rod are then moved downward so as to enter the bushing 50 into the body bore 14 until the base of the chuck body rests on the upper end of the vertical fixture cylinder 58. The bushing 50 is thereby positioned coaxial with fixture aligning rod 62. With the chuck and fixture maintained in this position, heat is applied to harden the cement 52, thereby to rigidly fix the bushing in the chuck body. Thereafter, when a drill shank or other tool shank of substantially the same diameter as that of the upper end portion of the aligning rod is clamped in the chuck jaws, it will be held therein precisely concentric and in alignment with the tapered bore of bushing 50.

The amount of cement 52 applied to the outer surface of bushing 50 is sufficient to fill the annular space between bushing 50 and the body bore for a substantial portion of the length of the bushing 50. Preferably, the cement is applied to the upper portion of bushing 50, so that as the chuck body is slipped downward over the bushing, the cement is spread downward over the bushing and so that a minimum of surplus cement is extruded at the lower end of the chuck body.

While I have shown an alignment bushing 50 having a tapered exterior surface loosely fitting into and cemented in a tapered hole in the chuck body and having an interior surface tapered to receive the tapered end of a driving shaft as a preferred embodiment, it is to be understood that other forms of cemented aligning element 50 may be substantial without departing from the spirit of the invention.

For example, the cemented alignment bushing 50 may have a cylindrical exterior surface loosely fitted and cemented in a cylindrical bore of larger diameter in the chuck body and have a cylindrical interior surface adapted to closely fit the cylindrical end of a driving shaft. Further, a cemented aligning element having a portion loosely fitted into and cemented in the chuck body in alignment with the chuck jaws and having a projecting stud portion adapted to closely fit into a bore in the end of a drive shaft, or spindle, may also be substituted, without departing from the spirit of the invention.

We claim:

1. In a key-operated universal drill chuck in which elongated jaws slidably guided in forwardly converging bores in the chuck body arranged around the longitudinal axis thereof are adapted to engage and clamp a tool shank entered therein; the improvement which comprises an alignment member having an axially extending portion adapted to interfit with a driving shaft and said member being loosely entered into an axial bore in the rear end of said chuck body and rigidly cemented therein with said drive shaft engaging portion thereof positioned precisely concentric and in alignment with a cylinder clamped in said jaws.

2. In a universal drill chuck, a body member having a longitudinal bore therethrough, elongated chuck jaws slidably guided in forwardly converging passages in said body arranged around the longitudinal axis thereof and said jaws being arranged to grasp a tool entered therein, a counterbore in the rear end of said body, and a bushing having an internal bore adapted to interfit with a driving shaft, and said bushing being loosely entered into said counterbore and rigidly cemented therein with the internal bore thereof positioned precisely concentric and in alignment with a cylinder clamped in said chuck jaws.

3. The device claimed in claim 2 in which said bushing is round and has a tapered bore.

4. The device claimed in claim 2 in which said bushing is round and both internal and external surfaces thereof are tapered.

5. The device claimed in claim 2 in which said bushing is cemented in said body with an epoxy resin cement having a soft paste form, thereby permitting movement of said bushing in said counterbore, and being heat hardenable to form a rigid structural joint, thereby to rigidly fix said bushing in said counterbore.

* * * * *